United States Patent
Banner et al.

(10) Patent No.: US 7,983,509 B1
(45) Date of Patent: Jul. 19, 2011

(54) ESTIMATING A POINT SPREAD FUNCTION OF AN IMAGE CAPTURE DEVICE

(75) Inventors: Ron Banner, Haifa (IL); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1083 days.

(21) Appl. No.: 11/756,350

(22) Filed: May 31, 2007

(51) Int. Cl.
*G06K 9/40* (2006.01)

(52) U.S. Cl. ......................................... 382/275; 382/266

(58) Field of Classification Search .................. 382/275, 382/266, 167, 254, 255, 276, 282; 348/345, 348/349, 354, 355; 345/589, 596, 601, 611
See application file for complete search history.

(56) References Cited

U.S. PATENT DOCUMENTS

| | | | | |
|---|---|---|---|---|
| 6,154,574 A | * | 11/2000 | Paik et al. | 382/255 |
| 7,728,844 B2 | * | 6/2010 | Trimeche et al. | 345/589 |
| 2007/0165961 A1 | * | 7/2007 | Lu | 382/254 |
| 2010/0080487 A1 | * | 4/2010 | Yitzhaky et al. | 382/266 |

* cited by examiner

*Primary Examiner* — Yon Couso

(57) ABSTRACT

In a method for estimating a point spread function of an image capture device, a first function representing a captured version of a first test image is obtained, where the first test image containing a substantially ideal vertical transition. A second function representing a captured version of a second test image is also obtained, where the second test image contains a substantially ideal horizontal transition. In addition, the point spread function is estimated from the first function and the second function. Also disclosed herein is a method for image degradation compensation that employs the method for estimating a point spread function.

19 Claims, 5 Drawing Sheets

ESTIMATING A POINT SPREAD FUNCTION OF AN IMAGE CAPTURE DEVICE

BACKGROUND

The optical resolution of scanners and other image capture devices is continually being increased. This increase allows a greater amount of information to be captured, which oftentimes also increases the appearance of defects or other image degradations in the high resolution captured images. As such, enhancement of the resolution while reducing the appearance of defects is becoming ever more important.

For single close-coupled device (CCD) line sensors, the sampling rate, which determines the resolution of the image, is typically determined by the center-to-center distance of the detectors in the CCD-line sensors. For multiple CCD-line sensors, the sampling rate is increased by arranging the detectors in a staggered array. More specifically, the staggered sensor array uses multiple CCD-lines that are shifted from each other by a fraction of the width of one CCD detector. The staggered arrangement of detectors improves the sample rate, but deteriorates the point spread function because it adds jaggedness artifacts.

In addition to the jaggedness artifacts, captured images also suffer from other sources of image degradation. The image degradation may be categorized as "motion blur" and "optical blur". "Motion blur" generally occurs because the movement of the sensors produces an image that is the integration of the same object over different positions, which causes the object to appear blurred or smeared along the opposite direction of the motion. "Optical blur" generally occurs due to variations in the distance to the object from the optimal focal distance and resolution of image capture device lens.

Standard attempts at reducing or eliminating the image degradation are typically based on heuristic image enhancement methods that often fail to capture the real source of the image degradation. For example, in current implementations, because the jaggedness artifacts are more readily seen along horizontal edges, the scanned image is often smoothed in the x-direction. This approach, however, is not appropriate for high resolution applications because it blurs the image and reduces its quality. Another approach to overcoming different sources of blurs has been to sharpen the image. This approach, however, has been found, in various situations, to also sharpen the jaggedness artifacts.

An improved approach to eliminating blurs and jaggedness artifacts, would therefore be beneficial, particularly for high resolution image capture applications.

BRIEF DESCRIPTION OF THE DRAWINGS

Features of the present invention will become apparent to those skilled in the art from the following description with reference to the figures, in which.

DETAILED DESCRIPTION

Figure 1A:
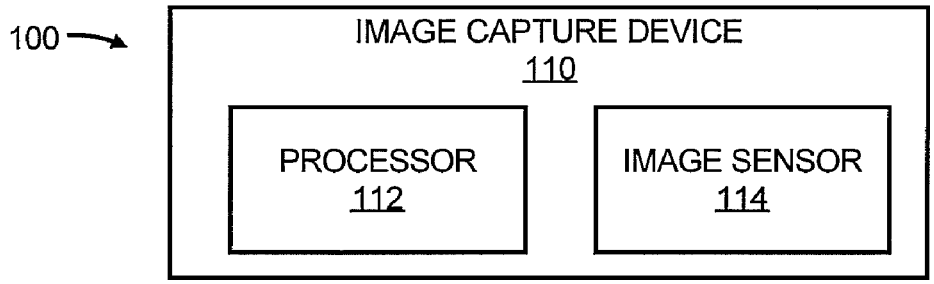
FIGS. 1A-1C, respectively, show block diagrams of electronic devices configured to implement various embodiments of the invention, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and system for estimating a point spread function (PSF) of an image capture device. The PSF generally describes the response of the image capture device to a point source or point object. In other words, the PSF is the image capture device's impulse response. The degree of spreading (blurring) of the point object is a measure of the quality of the image capture device. As discussed herein below, the estimated PSF may be employed in compensating for image degradation that may occur during an image acquisition operation performed by the image capture device.

Also disclosed herein are a method and system for compensating for the image degradation that has occurred during an image acquisition operation. The image degradation may be quantified by the estimated PSF discussed above, as well as other image degrading factors, such as, additive noise. More particularly, for instance, the image degradation may be modeled by the following equation:

$$g(x,y)=h(x,y)*f(x,y)+\eta(x,y). \qquad \text{Equation (1)}$$

In Equation (1), $g(x,y)$ represents an image captured by the image capture device, which may include one or more image degradations, $f(x,y)$ represents the ideal image, which may comprise a nearly identical reproduction of an original image, $h(x,y)$ represents the point spread function (PSF), and $\eta(x,y)$ represents additive noise. The symbol "*" represents the convolution operator, which models the image degradation. With respect to the PSF, the common assumption that $h(x,y)$ is a linear position-invariant degradation is made. As disclosed in greater detail herein below, the ideal image $f(x,y)$ may be restored from the captured image $g(x,y)$ by estimating the PSF $h(x,y)$ and the additive noise $\eta(x,y)$.

The methods and systems disclosed herein may be employed to restore captured images that have been degraded due to time-independent distortions that have been induced by the image capture device 110, such as, jaggedness artifacts, motion blurs, optical blurs, sensor architecture, etc. In addition, the methods and systems disclosed herein may be implemented in any of a number of different types of electronic devices and/or media.

Various examples of the different types of electronic devices and media are discussed herein below with respect to FIGS. 1A-1C. More particularly, FIGS. 1A-1C, respectively, show block diagrams of electronic devices 100 configured to implement various embodiments of the invention, according to an example. It should be understood that the electronic devices 100 depicted in FIGS. 1A-1C may include additional components and that some of the components described herein may be removed and/or modified without departing from a scope of the electronic device 100.

In a first example as shown in FIG. 1A, the electronic device 100 may comprise an image capture device 110, such as, a scanner, a photocopier, a facsimile machine, a digital camera, a telescope, a microscope, etc. The image capture device 110 includes a processor 112 and an image sensor 114. The processor 112 may comprise, for instance, a digital signal processor, an ASIC, or the like, for estimating a point spread function (PSF) of the image capture device 110 from images captured by the image sensor 114. The processor 112 may also be configured to estimate noise levels in images captured by the image sensor 114. The processor 112 may, moreover, be configured to compensate for the PSF and the noise of the image capture device 110. The image sensor 114 may comprise a relatively high resolution image sensor, such as an image sensor that is capable of acquiring images at 1200 dpi or greater resolutions. Various operations performed by the process 112 are described in greater detail herein below with respect to the flow diagrams.

Figure 1B:
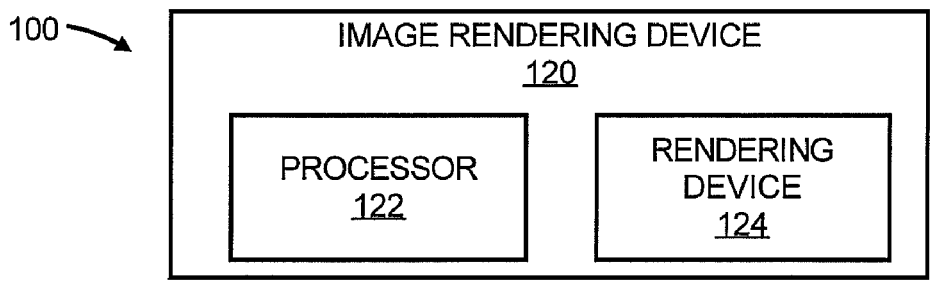

In a second example as shown in FIG. 1B, the electronic device 100 may comprise an image rendering device 120, such as, a printing device, facsimile machine, photocopier, etc. In the second example, the image rendering device 120 may be configured to receive images captured by the image capture device 110. The image capture device 110 may additionally be integrally formed with the image rendering device 120. Moreover, the processor 112 may be omitted from the image capture device 110 and the functions performed by the processor may be performed by a processor 122 of the image rendering device 120. The image rendering device 120 may also include a rendering device 124, such as, a print engine.

The processor 122 of the image rendering device 120 may comprise, for instance, a digital signal processor, an ASIC, or the like, for receiving images and for estimating a point spread function (PSF) of the image capture device 110. The processor 122 may also be configured to estimate noise levels in images captured by the image capture device 110. The processor 122 may, moreover, be configured to compensate for the PSF and the noise of the image capture device 110. Furthermore, the processor 122 may convert, for instance, halftone, images to a format suitable for rendering by the rendering device 124, and may send the converted images to the rendering device 124. The processor 122 may perform other types of processing that are not based on PSF estimation, such as, for instance, JPEG decoding.

Figure 1C:
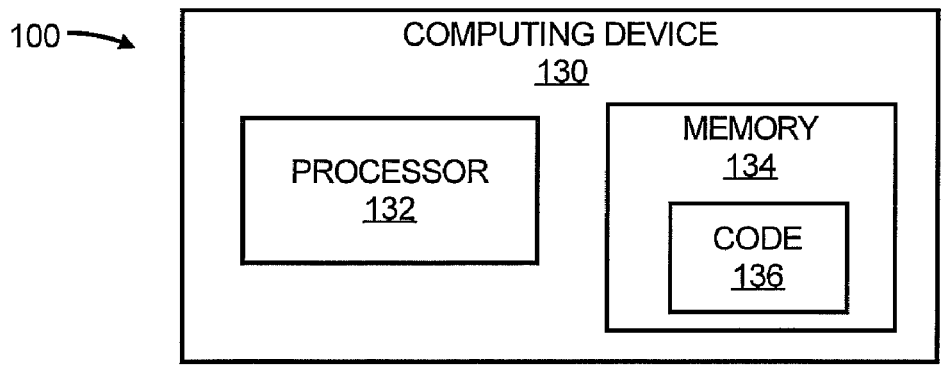
Figure 1C:
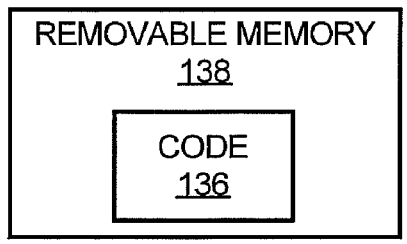

In a third example as shown in FIG. 1C, the electronic device 100 may comprise a computing device 130, such as, a personal computer, a server, a personal digital assistant, etc. In the third example, the computing device 130 may be configured to receive images captured by the image capture device 110. The image capture device 110 may additionally be integrally formed with the computing device 130. Moreover, the processor 112 may be omitted from the image capture device 110 and the functions performed by the processor 112 may be performed by a processor 132 of the computing device 130. These and other functions may be stored in a memory 134 as code 136 which the processor 132 may invoke or implement.

The code 136 may be distributed as a standalone application, part of a larger program, such as, an image editing program, a web browser plug-in, a function that is activated whenever a new image is received, etc. The code 136 may also be distributed to the computing device 130 via removable memory 138, such as, an optical disk, a magnetic disk, or other removable media or via a network connection, etc.

Figure 2:
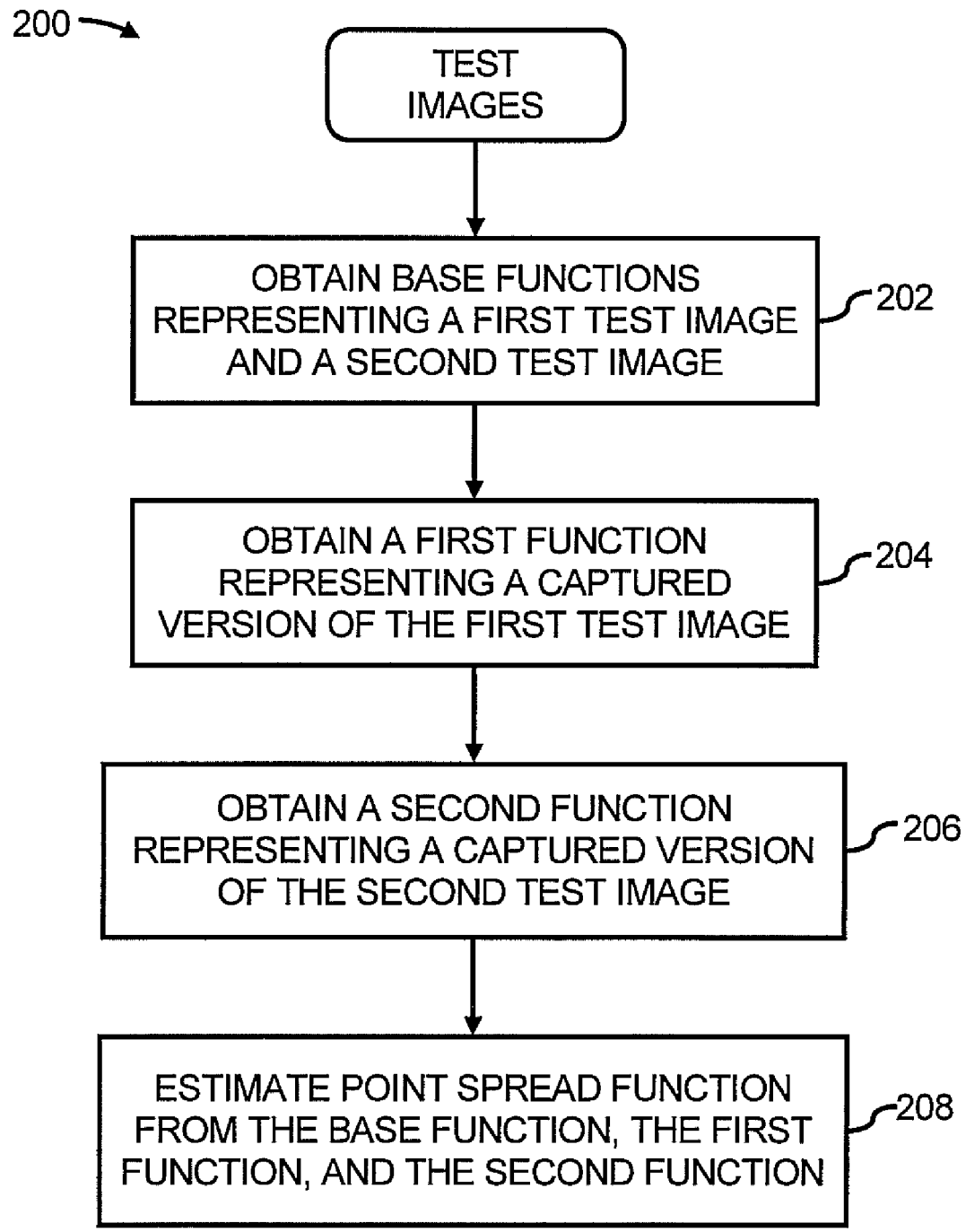
FIG. 2 shows a flow diagram of a method for estimating a point spread function of an image capture device, according to an embodiment of the invention.
Figure 4:
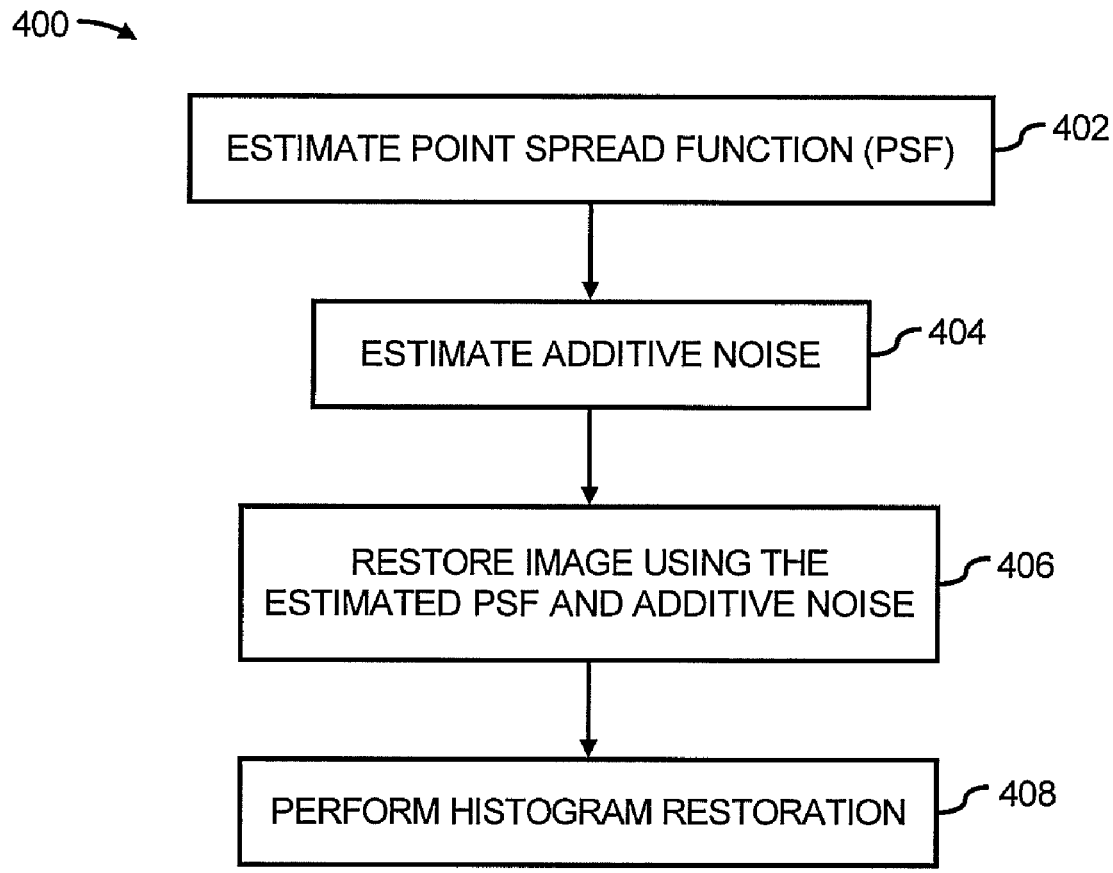
FIG. 4 shows a method for restoring a degraded image through use of an estimated point spread function, according to an embodiment of the invention.

Some of the operations performed by one or more of the processors 112, 122, 132 of the various examples of the electronic device 100 are depicted and described with respect to the flow diagrams respectively illustrated in FIGS. 2 and 4.

With reference first to FIG. 2, there is shown a flow diagram of a method 100 for estimating a point spread function of an image capture device 110, according to an example. It should be apparent to those of ordinary skill in the art that the method 200 represents a generalized illustration and that other steps may be added or existing steps may be removed, modified or rearranged without departing from a scope of the method 200.

Generally speaking, the method 200 may be implemented to estimate the point spread function (PSF) that contains, for instance, motion blur, lens blur, jaggedness artifacts, etc., that are induced by the image capture device 110.

The description of the method 200 is made with reference to the electronic devices 100 illustrated in FIGS. 1A-1C, and thus makes reference to the elements cited therein. It should, however, be understood that the method 200 is not limited to the elements set forth in the electronic devices 100. Instead, it should be understood that the method 200 may be practiced by an electronic device having a different configuration than those set forth in FIGS. 1A-1C.

At step 202, base functions f(x,y) representing a first test image 300 and a second test image 310 may be obtained. The base functions f(x,y) representing the first test image 300 and the second test image 310 may, for instance, be inputted into the processor 112, 122, 132. In addition, the base functions f(x,y) generally represent ideal images of the first test image 300, which may be represented as $(f_1(n_x,n_y)$ and the second test image 310, which may be represented as $f_2(n_x,n_y)$. The first test image 300 and the second test image 310 are respectively depicted in FIGS. 3A and 3B.

Figure 3A:
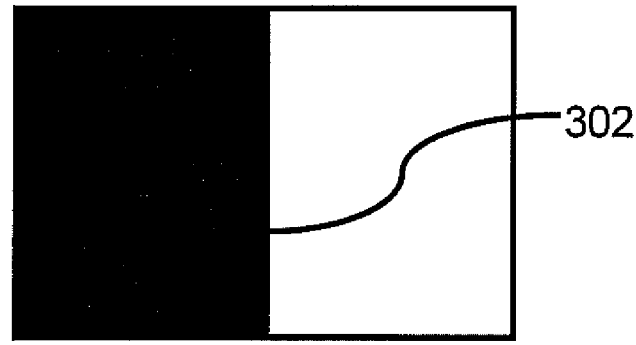
FIGS. 3A and 3B, respectively, depict first and second test images for use in estimating a point spread function, according to an embodiment of the invention.
Figure 3B:
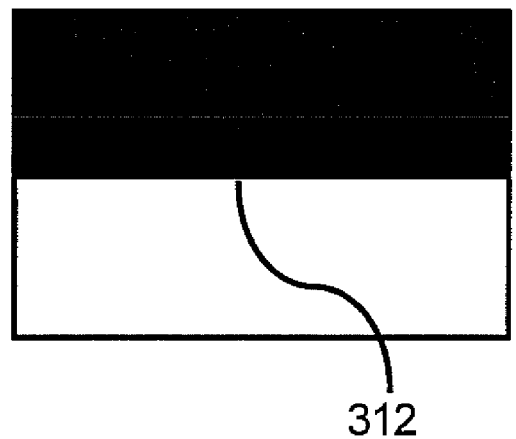

As shown in FIGS. 3A and 3B, the first test image 300 depicts a substantially optimal vertical edge 302 and the second test image 310 depicts a substantially optimal horizontal edge 312. Generally speaking, the test images 300 and 310 depict substantially "ideal" transitions 302, 312 between the white and the black areas and the transitions 302, 312 may be considered as step transitions. The terms "substantially ideal" are intended to denote that the transition 302 is nearly perfectly vertical and the transition 312 is nearly perfectly horizontal. It should be understood that the degree to which the transitions 302 and 312 may vary from the respective nearly perfectly vertical and nearly perfectly horizontal arrangements may vary for different applications. For instance, lesser levels of deviation from the ideal horizontal and vertical arrangements may be allowed in applications involving relatively higher resolution image capture devices 110.

In addition, the first and second test images 300 and 310 may comprise any reasonably suitable size that is sufficiently large for the processes described herein below to be performed. By way of example, the transitions 302 and 312 in the test images 300 and 310 may comprise lengths that are at least twice as long as the predicted lengths of degradations contained in the captured images. Thus, for instance, for a 4800 dpi image capture device 110, the image degradations, such as, blurs, were found to be around twenty-four pixels. In this example, the transitions 302 and 312 may have lengths equivalent to about one hundredth of an inch. In any regard, the sizes of the test images 300 and 310 may be assumed to be M×N pixels.

At step 204, a first function representing a captured version $g_1(n_x,n_y)$ of the first test image 300 is obtained. Likewise, at step 206, a second function representing a captured version $g_2(n_x,n_y)$ of the second test image 310 is obtained. As such, prior to steps 204 and 206, the captured versions $g_1(n_x,n_y)$ and $g_2(n_x,n_y)$ of the first test image 300 and the second test image 310 may be obtained through implementation of the image capture device 110.

At step 208, the PSF h(x,y) is estimated from the base function obtained at step 202, the first function obtained at step 204 and the second function obtained at step 206. For purposes of calculating the PSF, pixels contained in each of the captured versions $g_1(n_x,n_y)$ and $g_2(n_x,n_y)$ are considered to be independent from each other if their distance is larger than d. In addition, it is assumed that the PSF, otherwise considered as a blur kernel h(x,y) may be decomposed into a blur kernel h(x) on the x-direction and a blur kernel h(y) on the y-direction, such that h(x,y)=h(x)⊗h(y).

With these assumptions, the PSF (blur kernel) h(x,y) may be calculated through the following equation:

$$h(x, y) = \lim_{M \to \infty} \lim_{N \to \infty} \frac{d^2}{M \cdot N} \cdot$$
$$(G_1(n_x) - G_1(n_x - 1)) \otimes (G_2(n_y) - G_2(n_y - 1)),$$

Equation (2)

where the symbol ⊗ represents the outer-product operator.

In Equation (2), $$G_1(n_x) \equiv \sum_{n_y \in Nmodd=1} g_1(n_x, n_y) \text{ and } G_2(n_y) \equiv \sum_{n_x \in Mmodd=1} g_2(n_x, n_y).$$

In other words, $G_1(n_x)$ is equal to the sum of the values $g_1(n_x,n_y)$ along the vertical axis (transition 302) in the test image 300 and $G_2(n_y)$ is equal to the sum of the values $g_2(n_x,n_y)$ along the horizontal axis (transition 304) in the test image 310. In addition, or alternatively, instead of summing, $G_1(n_x)$ and $G_2(n_y)$ may be calculated based upon average, median, or other statistical values from the respective values $g_1(n_x,n_y)$ and $g_2(n_x,n_y)$.

The estimated PSF (blur kernel) h(x,y) may be employed in restoring an image captured by an image capture device, for instance, through use of Wiener filtering. In one example, the restoration process may be performed during fabrication of an image capture device 110, for instance, as part of an image capture device 110 calibration process. In another example, the restoration process may be stored as software and may be distributed to users for recalibration of an image capture device 110 after the image capture device 110 has been delivered to the users.

In any regard, as depicted in FIG. 4, the estimated PSF (blur kernel) h(x,y) may be employed in a method 400 for restoring a degraded image, according to an example. It should be apparent to those of ordinary skill in the art that the method 400 represents a generalized illustration and that other steps may be added or existing steps may be removed, modified or rearranged without departing from a scope of the method 400.

As shown in FIG. 4, the PSF (blur kernel) h(x,y) is estimated at step 402. The PSF (blur kernel) h(x,y) may be estimated as discussed above with respect to the method 200 (FIG. 2).

Figure 5:
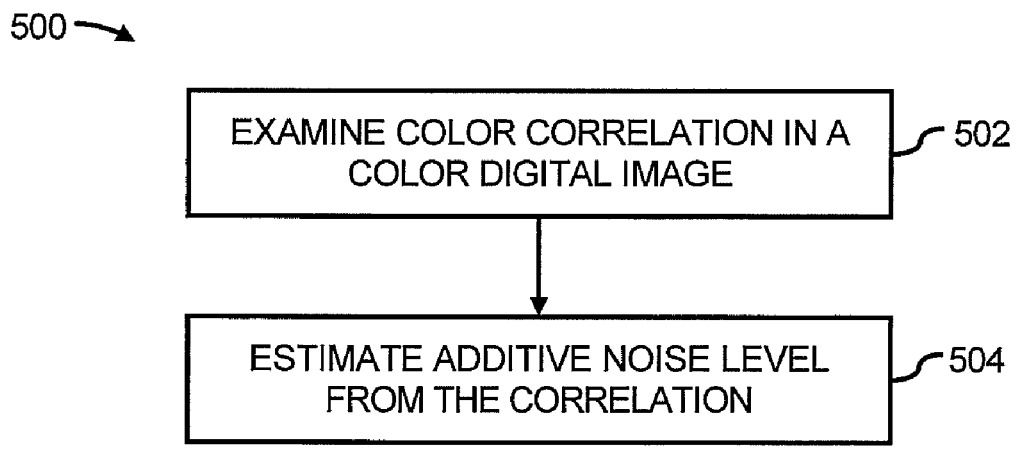
FIG. 5 shows a method for estimating additive noise in an image, according to an embodiment of the invention.

At step 404, the additive noise η(x,y) may be estimated. Step 404 may be considered optional because a degraded image may be restored through use of the PSF without regard to the additive noise η(x,y). In the event that the additive noise η(x,y) is estimated at step 404, the additive noise η(x,y) may be estimated based upon color information contained in a digital image, as shown in FIG. 5. FIG. 5, more particularly, depicts a method 500 for estimating noise level in a color image, according to an example. As shown in FIG. 5, color correlation in a color digital image is examined at step 502. The color correlation may be examined, for instance, by comparing the agreement between local difference measures of different color channels. The local difference measures include, without limitation, gradients, derivatives, and norms to the derivatives. Examples of norms include, Langwitch gradients and Minkowski norms ("Lp"). At step 504, the additive noise level may be estimated from this agreement.

Various manners in which the additive noise level may be estimated are described in greater detail in copending and commonly assigned U.S. patent application Ser. No. 11/280,097, filed on Nov. 16, 2005, and lists Carl Staelin et al. as the inventors, the disclosure of which is hereby incorporated by reference in its entirety.

With reference back to FIG. 4, at step 406, an image captured with the image capture device 110 may be restored through use of the PSF (blur kernel) h(x,y) of the image capture device 110 estimated at step 402. The additive noise η(x,y) estimated at step 404 may also be used in restoring the image. According to an example, the degraded image may be restored by invoking, for instance, the Wiener filtering approach that finds an estimate f̂(x,y) of the uncorrupted image f(x,y) based upon the PSF (blur kernel) h(x,y) and, optionally, the additive noise η(x,y), such that the mean square error between them is minimized. In other words, the solution minimizes $E\{(f-\hat{f})^2\}$, where E{•} is the expected value of the argument. It should be understood that the Wiener filtering approach is an example of a suitable filtering technique and that other filtering techniques may be instead be employed without departing from a scope of the method 400. In this regard, it should be understood that any reasonably suitable linear deconvolution technique may be employed to reconstruct the captured image, such as, for instance, Lucy-Richardson, etc.

The image restored at step 406 may, however, require additional restoration because application of the Wiener filtering may result in color drift. Because Wiener filtering sharpens the captured image, the Wiener filtering often influences substantially only the higher frequencies of the captured image, while leaving the lower frequencies that correspond to the color composition of the captured image substantially unchanged. For instance, consider the discrete Fourier transform of the input captured image G(u,v) and the restored image F̂(u,v) after applying the Wiener deconvolution. In both images, the low frequencies correspond to the slowly varying components of an image, for instance, image color composition, while the high frequencies correspond to faster changes like edges of objects or noise.

According to an example, this insight is used to restore the histograms of the captured image to more closely resemble those of the original image, as indicated at step 408. More specifically, a final image $F_{final}$ is constructed in the frequency domain by taking from the captured image G(u,v) all the low frequencies and from the Wiener restored image F̂(u,v) all the high frequencies. Formally, the following equation describes the procedure:

$$F_{final}=H_{LP}(u,v) \cdot G(u,v)+(1-H_{LP}(u,v)) \cdot \hat{F}(u,v).$$ Equation (3)

In Equation (3), $H_{LP}(u,v)$ denotes a low-pass filter and the term $(1-H_{LP}(u,v))$ is, in essence, the transfer function of a high-pass filter. By way of example, a cutoff frequency of around 5 for $H_{LP}(u,v)$ is sufficient to ensure that the color composition of the original image is recovered while preserving the high frequencies of the image that was restored through Wiener deconvolution. The output is then obtained by computing the inverse discrete Fourier transform of $F_{final}$.

According to an example, steps 406 and 408 may be repeated as the image capture device 110 captures additional images upon which distortions are introduced by the image capture device 110. As such, steps 402 and 404 may be implemented as part of a calibration process for the image capture device 110, which may be repeated to restore images captured by the image capture device 110, at step 406.

The operations set forth in one or more of the methods 200, 400, and 500 may be contained as one or more utilities, programs, or subprograms, in any desired computer accessible or readable medium. In addition, one or more of the methods 200, 400, and 500 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 6:
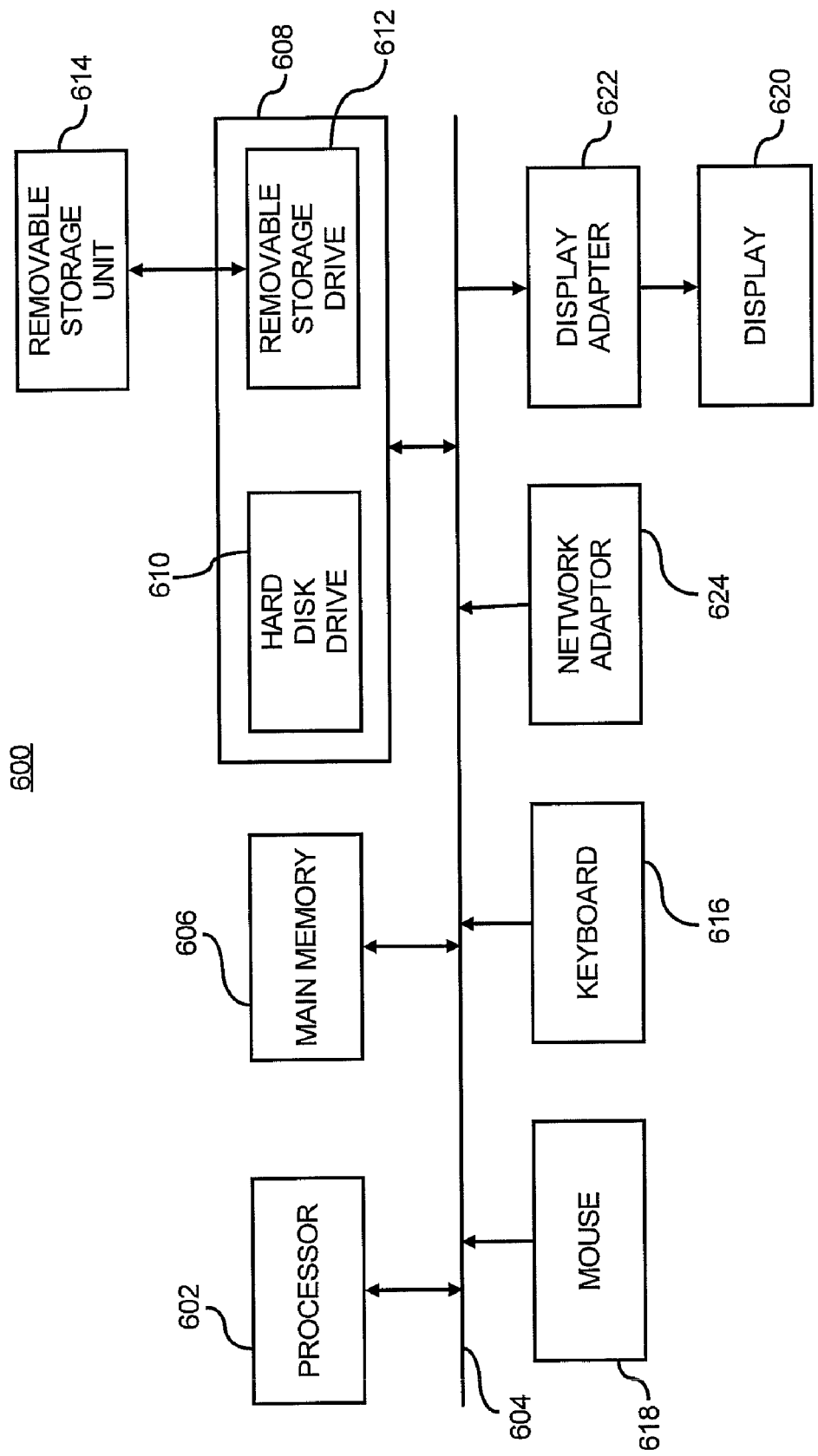
FIG. 6 illustrates a computer system, which may be employed to perform various functions of one or more of the electronic devices depicted in FIGS. 1A-1C, according to an embodiment of the invention.

FIG. 6 illustrates a computer system 600, which may be employed to perform the various functions of one or more of the electronic devices 100 described herein above with respect to FIGS. 1A-1C, according to an example. In this respect, the computer system 600 may be used as a platform for executing one or more of the functions described hereinabove with respect to the electronic devices 100.

The computer system 600 includes a processor 602, which may be used to execute some or all of the steps described in the methods 200, 400, and 500. Commands and data from the processor 602 are communicated over a communication bus 604. The computer system 600 also includes a main memory 606, such as a random access memory (RAM), where the program code for, for instance, the processors 112, 122, and 132, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for at least one of estimating a PSF of an image capture device and for image degradation compensation in an image capture device may be stored.

The removable storage drive 610 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor 602 may communicate over a network, for instance, the Internet, LAN, etc., through a network adaptor 624.

It will be apparent to one of ordinary skill in the art that other known electronic components may be added or substituted in the computer system 600. In addition, the computer system 600 may include a system board or blade used in a rack in a data center, a conventional "white box" server or computing device, etc. Also, one or more of the components in FIG. 6 may be optional (for instance, user input devices, secondary memory, etc.).

Through implementation of the methods and systems disclosed herein, the captured image is not being blurred to remove the jaggedness artifacts. Instead, the methods and systems disclosed herein generally enable the captured image to be sharpened while also removing the jaggedness artifacts.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for estimating a point spread function of an image capture device, said method comprising:
obtaining a first function representing a captured version of a first test image, said first test image containing a substantially ideal vertical transition;
obtaining a second function representing a captured version of a second test image, said second test image containing a substantially ideal horizontal transition; and
estimating, by a processor, the point spread function from the first function and the second function.

2. The method according to claim 1, further comprising:
obtaining base functions representing the first test image and the second test image, and wherein estimating the point spread function further comprises estimating the point spread function from the base functions.

3. The method according to claim 1, wherein obtaining the first function further comprises capturing a first image of the first test image and obtaining the first function from the first captured image, said first captured image comprising a plurality of first pixel values, and wherein obtaining the second function further comprises capturing a second image of the second test image and obtaining the second function from the second captured image, said second captured image comprising a plurality of second pixel values.

4. The method according to claim 3, wherein obtaining the first function further comprises obtaining the plurality of first pixel values and summing the plurality of first pixel values and wherein obtaining the second function further comprises obtaining the plurality of second pixel values and summing the plurality of second pixel values.

5. The method according to claim 3, wherein obtaining the first function further comprises calculating a statistical value from the plurality of first pixel values to obtain the first function and wherein obtaining the second function further comprises calculating a statistical value from the plurality of second pixel values to obtain the second function.

6. The method according to claim 3, wherein estimating the point spread function further comprises estimating the point spread function h(x,y) according to the following equation:

$$h(x, y) = \lim_{M \to \infty} \lim_{N \to \infty} \frac{d^2}{M \cdot N} \cdot (G_1(n_x) - G_1(n_x - 1)) \otimes (G_2(n_y) - G_2(n_y - 1)),$$

wherein $G_1(n_x)$ is equal to a statistical value associated with the plurality of first pixel values, $G_2(n_y)$ is equal to a statistical value associated with the plurality of second pixel values, the symbol ⊗ represents the outer-product operator, d is a distance between independent pixels, and M and N, respectively denote the lengths and widths of the first and second test images.

7. The method according to claim 6, wherein the statistical value associated with the plurality of first pixel values comprises a summation of the plurality of first pixel values and wherein the statistical value associated with the plurality of second pixel values comprises a summation of the plurality of second pixel values.

8. The method according to claim 1, wherein the substantially ideal vertical transition and the substantially ideal horizontal transition have respective lengths that are at least twice as long as predicted lengths of degradations in images captured by the image capture device.

9. The method according to claim 1, further comprising:
employing the estimated point spread function to restore an image that has been degraded during an image acquisition operation performed by the image capture device.

10. A method for restoring a degraded image, said method comprising:
obtaining a first function representing a captured version of a first test image, said first test image containing a substantially ideal vertical transition;
obtaining a second function representing a captured version of a second test image, said second test image containing a substantially ideal horizontal transition;
obtaining base functions representing the first test image and the second test image;
estimating, by a processor, a point spread function of an image capture device from the base functions, the first function, and the second function; and
restoring the degraded image captured by the image capture device using the estimates of the point spread function.

11. The method according to claim 10, further comprising:
estimating an additive noise of the image capture device; and
wherein restoring the degraded image further comprises using an estimated additive noise to restore the degraded image.

12. The method according to claim 10, wherein restoring the image further comprises restoring the image captured by the image capture device by applying a linear deconvolution process.

13. The method according to claim 12, further comprising:
applying a histogram restoration process on the restored image, wherein applying the histogram restoration process further comprises:
constructing a final image having low frequencies and high frequencies, wherein the low frequencies are taken from an image captured by the image capture device and the high frequencies are taken from the restored image.

14. The method according to claim 13, wherein applying the histogram restoration process further comprises:
constructing the final image ($F_{final}$) from the following equation:

$$F_{final} = H_{LP}(u,v) \cdot G(u,v) + (1 - H_{LP}(u,v)) \cdot \hat{F}(u,v),$$

wherein $H_{LP}(u,v)$ denotes a low-pass filter, $(1-H_{LP}(u,v))$ denotes the transfer function of a high-pass filter, $G(u,v)$ denotes an image captured by the image capture device in the frequency domain, and $\hat{F}(u,v)$ denotes the restored image in the frequency domain.

15. The method according to claim 11, further comprising:
capturing another degraded image, wherein degradation of the another degraded image is induced by the image capture device; and
restoring the another degraded image using the estimates of the point spread function and the additive noise.

16. The method according to claim 10, wherein obtaining the first function further comprises capturing a first image of the first test image and obtaining the first function from the first captured image, said first captured image comprising a plurality of first pixel values, and wherein obtaining the second function further comprises capturing a second image of the second test image and obtaining the second function from the second captured image, said second captured image comprising a plurality of second pixel values.

17. The method according to claim 16, wherein estimating the point spread function further comprises estimating the point spread function h(x,y) according to the following equation:

$$h(x, y) = \lim_{M \to \infty} \lim_{N \to \infty} \frac{d^2}{M \cdot N} \cdot (G_1(n_x) - G_1(n_x - 1)) \otimes (G_2(n_y) - G_2(n_y - 1)),$$

wherein $G_1(n_x)$ is equal to a statistical value associated with the plurality of first pixel values, $G_2(n_y)$ is equal to a statistical value associated with the plurality of second pixel values, the symbol ⊗ represents the outer-product operator, d is a distance between independent pixels, and M and N, respectively denote the lengths and widths of the first and second test images.

18. A non-transitory computer readable storage medium on which is embedded one or more computer programs, said one or more computer programs implementing a method for estimating a point spread function of an image capture device, said one or more computer programs comprising computer readable code to:
obtain base functions representing a first test image and a second test image;
obtain a first function representing a captured version of the first test image, said first test image containing a substantially ideal vertical transition;
obtain a second function representing a captured version of the second test image, said second test image containing a substantially ideal horizontal transition; and
estimate the point spread function from the base functions, the first function, and the second function.

19. The non-transitory computer readable storage medium according to claim 18, said one or more computer programs further comprising computer readable code to:
estimate the point spread function h(x,y) according to the following equation:

$$h(x, y) = \lim_{M \to \infty} \lim_{N \to \infty} \frac{d^2}{M \cdot N} \cdot (G_1(n_x) - G_1(n_x - 1)) \otimes (G_2(n_y) - G_2(n_y - 1)),$$

wherein $G_1(n_x)$ is equal to a statistical value associated with a plurality of first pixel values from a captured image of the first test image, wherein $G_2(n_y)$ is equal to a statistical value associated with a plurality of second pixel values from a captured image of the second test image, the symbol ⊗ represents the outer-product operator, d is a distance between independent pixels, and M and N, respectively denote the lengths and widths of the first and second test images.

* * * * *